United States Patent
Ramasamy et al.

(10) Patent No.: US 10,931,626 B2
(45) Date of Patent: Feb. 23, 2021

(54) AUTOMATIC DISCOVERY OF MANAGEMENT SERVER IP ADDRESS USING DHCP FOR THIN CLIENT SOLUTION

(71) Applicant: AMZETTA TECHNOLOGIES, LLC, Norcross, GA (US)

(72) Inventors: Veerajothi Ramasamy, Duluth, GA (US); Varadachari Sudan Ayanam, Suwanee, GA (US); Balasubramanian Chandrasekaran, Chennai (IN); Indira Valmiki, Anantapur (IN)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 287 days.

(21) Appl. No.: 15/255,180

(22) Filed: Sep. 2, 2016

(65) Prior Publication Data
US 2018/0069829 A1    Mar. 8, 2018

(51) Int. Cl.
*G06F 15/173* (2006.01)
*H04L 29/12* (2006.01)
*H04L 29/08* (2006.01)
*H04L 12/24* (2006.01)

(52) U.S. Cl.
CPC .......... *H04L 61/2015* (2013.01); *H04L 41/12* (2013.01); *H04L 67/16* (2013.01); *H04L 41/0809* (2013.01)

(58) Field of Classification Search
None
See application file for complete search history.

(56) References Cited

U.S. PATENT DOCUMENTS

| | | | | |
|---|---|---|---|---|
| 2007/0220122 A1* | 9/2007 | Brown | ................ | H04L 41/0213 709/220 |
| 2008/0147830 A1* | 6/2008 | Ridgill | ................. | G06F 9/4416 709/222 |
| 2008/0304408 A1* | 12/2008 | Kraemer | ............. | H04L 12/2803 370/230 |
| 2009/0164555 A1* | 6/2009 | Bezanson | ............... | H04L 67/34 709/203 |
| 2012/0089713 A1* | 4/2012 | Carriere | ............. | H04L 12/4641 709/222 |

(Continued)

*Primary Examiner* — Brian Whipple
*Assistant Examiner* — Gregory P Tolchinsky
(74) *Attorney, Agent, or Firm* — Locke Lord LLP; Tim Tingkang Xia, Esq.

(57) ABSTRACT

Systems and methods for automatic discovery of a network address of a machine storing a management server application. The system includes a dynamic host configuration protocol (DHCP) server, which may perform internet protocol (IP) address leasing for DHCP clients. When the DHCP server performs IP address leasing to the machine storing the management server application, the DHCP server may configure a first IP address issued to the machine in vendor specific class information. When the DHCP server performs IP address leasing to a computing device functioning as a thin/zero client, the DHCP server may, in the IP address leasing process, send the vendor specific class information requested to the computing device. Thus, the computing device may retrieve the first network address of the machine from the vendor specific class information, and communicate with the management server application using the first network address of the machine.

15 Claims, 4 Drawing Sheets

(56) References Cited

U.S. PATENT DOCUMENTS

| | | | | |
|---|---|---|---|---|
| 2012/0197972 A1* | 8/2012 | Tukol | ................ | G06F 9/44505 709/203 |
| 2015/0052522 A1* | 2/2015 | Chanda | ................ | G06F 9/455 718/1 |
| 2015/0304274 A1* | 10/2015 | Zhang | ................ | H04L 61/2015 709/221 |
| 2015/0319043 A1* | 11/2015 | Dibirdi | ............. | H04L 41/0806 370/254 |
| 2015/0347683 A1* | 12/2015 | Ansari | ................ | H04L 63/08 726/7 |

* cited by examiner

AUTOMATIC DISCOVERY OF MANAGEMENT SERVER IP ADDRESS USING DHCP FOR THIN CLIENT SOLUTION

FIELD

The present disclosure relates generally to thin client or zero client technology, and more particularly to systems and methods for automatic discovery of an internet protocol (IP) address of a management server using a dynamic host configuration protocol (DHCP) service for the thin client solution.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A thin client or zero client device is a computer solution whose major role is to connect a physical machine or a virtual machine via a remote access protocol using the operating system (OS) and other applications programmed in the hardware. Once a remote session is established to a computer (the physical machine or virtual machine) using a thin client, all the user activity is processed on the remote computer, and the data is stored back in the remote computer. Thin client or zero client solutions provide high performance and security by storing the data in a centralized location. For a thin client device, security plays a major role in using the device, and there may exist a management server application to take control of the device. From the management server application, an administrator can perform management features to the device, such as monitoring the device accessibility, controlling the device access and authorization for each user, assigning desktops to the users, etc. In some cases, the management server application may be deployed on a desktop or a virtual machine. In order to communicate with the management server application, each of the thin client devices must have the IP address of the desktop or the virtual machine on which the management server application is deployed. However, this requires manual intervention of the users.

Therefore, an unaddressed need exists in the art to address the aforementioned deficiencies and inadequacies.

SUMMARY

Certain aspects of the present disclosure direct to a system, which includes a computing device communicatively connected to a dynamic host configuration protocol (DHCP) server via a network. The computing device is configured to: send a request for vendor specific class information to the DHCP server; receive the vendor specific class information requested from the DHCP server, wherein the vendor specific class information comprises a first network address of a machine storing a management server application, and the computing device functions as a thin client or a zero client managed by the management server application; and retrieve the first network address of the machine storing the management server application from the vendor specific class information.

In certain embodiments, the machine storing the management server application is a management server computing device or a virtual machine.

In certain embodiments, the management server application is deployed to and executed on the management server computing device or the virtual machine.

In certain embodiments, the DHCP server is configured to: receive a network address request from a DHCP client, wherein the DHCP client is the machine storing the management server application or the computing device; in response to the network address request, issue a network address to the DHCP client; and when the DHCP client is the machine storing the management server application, configure the first network address of the machine storing the management server application in the vendor specific class information.

In certain embodiments, the network address issued by the DHCP server is an internet protocol (IP) address.

In certain embodiments, the computing device is configured to send the request for the vendor specific class information to the DHCP server in response to receiving the network address issued to the computing device from the DHCP server.

In certain embodiments, the computing device is further configured to: communicate with the management server application using the first network address of the machine storing the management server application.

Certain aspects of the present disclosure direct to a system, which includes a DHCP server, configured to: configure a first network address of a machine storing a management server application in vendor specific class information; receive a network address request from a computing device functioning as a thin client or a zero client managed by the management server application via the network; in response to the network address request, issue a second network address to the computing device; receive a request for the vendor specific class information from the computing device via the network; and in response to the request for the vendor specific class information, send the vendor specific class information requested to the computing device, wherein the computing device is configured to retrieve the first network address of the machine storing the management server application from the vendor specific class information.

In certain embodiments, the machine storing the management server application is a management server computing device or a virtual machine. In certain embodiments, the management server application is deployed to and executed on the management server computing device or the virtual machine.

In certain embodiments, each of the first network address and the second network address issued by the DHCP server is an IP address.

In certain embodiments, the DHCP server is further configured to: receive an IP address request from the machine storing the management server application via a network; and in response to the IP address request, issue the first network address to the machine storing the management server application.

In certain embodiments, the computing device is further configured to: send the second network address request to the DHCP server via the network; receive the second network address issued to the computing device from the DHCP server; send the request for the vendor specific class information to the DHCP server via the network; and receive the vendor specific class information requested from the DHCP server. In certain embodiments, the computing device is configured to send the request for the vendor specific class information to the DHCP server in response to receiving the second network address issued to the computing device from the DHCP server. In certain embodiments, the computing device is further configured to: communicate with the management server application using the first network address of the machine storing the management server application.

Certain aspects of the present disclosure direct to a method for automatic discovery of a network address of a machine storing a management server application. In certain embodiments, the method includes: configuring, by a DHCP server, a first network address of the machine in vendor specific class information; receiving, by the DHCP server, a second network address request from a computing device functioning as a thin client or a zero client managed by the management server application via the network; in response to the second network address request, issuing, by the DHCP server, a second network address to the computing device; receiving, by the DHCP server, a request for the vendor specific class information from the computing device; and in response to the request for the vendor specific class information, sending, by the DHCP server, the vendor specific class information requested to the computing device, wherein the computing device is configured to retrieve the first network address of the machine storing the management server application from the vendor specific class information.

In certain embodiments, the method further includes: receiving, by the DHCP server, an IP address request from the machine storing the management server application via the network; and in response to the IP address request, issuing, by the DHCP server, the first network address to the machine storing the management server application. In certain embodiments, the computing device is further configured to: send the second network address request to the DHCP server via the network; receive the second network address issued to the computing device from the DHCP server; in response to receiving the second network address issued to the computing device from the DHCP server, send the request for the vendor specific class information to the DHCP server via the network; receive the vendor specific class information requested from the DHCP server; and communicate with the management server application using the first network address of the machine storing the management server application.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
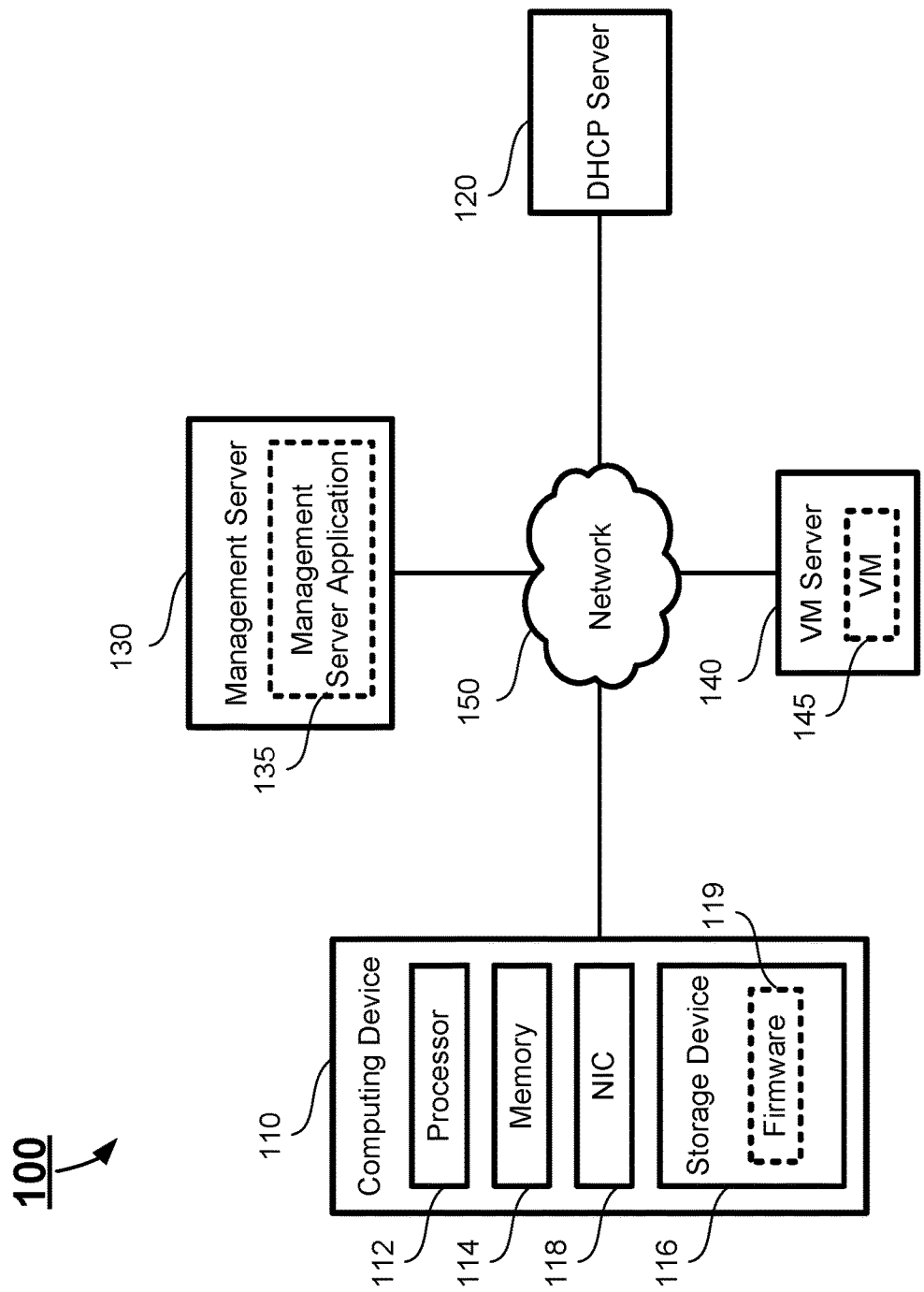
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on BMC simulator. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, thin client or zero client solutions are designed to provide high performance and security. In certain embodiments, a thin client device can be a small device with minimal requirement for hardware such as a keyboard, a mouse, a monitor, one or more universal serial bus (USB) ports and a network interface card (NIC), such as an Ethernet card. The thin client or zero client device needs to be configured appropriately to enhance the security. Further, the management server application may be used to control the thin client devices. However, in the case that the management server application is deployed on a desktop or a virtual machine. in order to communicate with the management server application, the thin client devices must have the IP address of the desktop or the virtual machine on which the management server application is deployed. Thus, there is a need to provide a system that automatically determines the IP address of the desktop or virtual machine where the management server application is deployed.

In certain embodiments, the IP address of the machine (which may be a desktop or a virtual machine) running the management server application can be configured by a dynamic host configuration protocol (DHCP) service. DHCP is a network protocol used to configure network devices so that the devices may communicate to one another on an IP network. Specifically, a DHCP service receives requests for IP addresses from other devices on the network, and issues IP addresses in response to such requests such that other server and client machines on the network may identify the device with the IP address being assigned. The DHCP protocol is implemented in a client-server model, in which DHCP clients request configuration data, such as an IP address, a default route, and other configuration information from the DHCP server. In certain embodiments, the DHCP clients may include all of the computing devices and the servers in the system 100 that requires the IP address from the DHCP server.

In certain embodiments, the IP address of the machine running the management server application can be configured by the DHCP service, and the machine IP address may change based on the IP lease configuration when DHCP is enabled. The machine IP address has to be updated to the thin client computing devices appropriately, such that the thin client computing devices may communicate with the machine running the management server application. This can be automated by configuration of the DHCP server and the thin client computing devices, such that the thin client computing devices may automatically obtain the management server IP address.

Certain aspects of the present disclosure relate to a system for automatic discovery of an IP address of a management server using a DHCP service for the thin client solution. FIG. 1 schematically depicts a system according to certain embodiments of the present disclosure. As shown in FIG. 1, the system 100 includes a computing device 110 functioning as a thin client or a zero client, a DHCP server 120, a management server 130 where the management server application 135 is deployed, and a virtual machine (VM) server 140 where at least one VM 145 is located. The computing device 110, the DHCP server 120, the management server 130 and the VM server 140 are communicatively interconnected with a network 150. In certain embodiments, the network 150 may be a wired or wireless network, and may be of various forms. Examples of the network 150 may include, but is not limited to, a local area network (LAN), a wide area network (WAN) including the Internet, or any other type of networks.

The computing device 110 is a computer functioning as a thin client or a zero client of the system 100. In certain embodiments, the system 100 may include multiple computing devices 110, each functioning as a thin client or a zero client of the system 100. As shown in FIG. 1, the computing device 110 includes a processor 112, a memory 114, a storage device 116, and a NIC 118. In certain embodiments, the computing device 110 may include other hardware components and software components (not shown) to perform its corresponding tasks. Examples of these hardware and software components may include, but not limited to, other required memory, interfaces, buses, Input/Output (I/O) modules and peripheral devices.

The processor 112 is a processor configured to control operation of the computing device 110. The processor 112 can execute any computer executable code or instructions, such as the firmware 119 of the computing device 110 or other applications and instructions of the computing device 110. In certain embodiments, the computing device 110 may run on more than one processor, such as two processors, four processors, or any suitable number of processors.

The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

The storage device 116 is a non-volatile data storage media for storing the applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the applications of the computing device 110 may be stored in one or more of the storage devices 116 of the computing device 110.

The NIC 118 is a network interface, which functions as a point of interconnection for the computing device 110 with the DHCP server 120, the management server 130 or any other device through the network 150, such that the computing device 110 may be in communication with the DHCP server 120 and/or the management server 130 if needed. In certain embodiments, the NIC 118 may be implemented by hardware and/or software components, and does not necessarily have a physical form. In certain embodiments, the computing device 110 may include more than one NIC 118 to be connectable to multiple different networks.

As shown in FIG. 1, the applications stored in the storage device 116 of the computing device 110 may include the firmware 119. The firmware 119 includes computer executable code or instructions executable at the processor 112 to control the basic operation of the computing device 110 as the thin client or the zero client. In certain embodiments, the computer executable code or instructions may include a plurality of modules to collectively form the firmware 119. In certain embodiments, the storage device 116 may store other applications independent from the firmware 119.

In certain embodiments, the firmware 119 may send a request to the DHCP server 120 via the network 150, in order to request an IP address for the computing device 110. In response, the firmware 119 may receive a corresponding IP address issued to the computing device 110 from the DHCP server 120. Upon receiving the IP address of the computing device 110, the firmware 119 may send another request for the vendor specific class information to the DHCP server 120 via the network 150. Specifically, the vendor specific class information includes information of the IP address of the management server 130 where the management server application 135 is located. In response, the firmware 119 may receive the vendor specific class information from the DHCP server 120 via the network 150. Upon receiving the vendor specific class information, the firmware 119 may parse the vendor specific class information, and retrieve the IP address of the management server 130 from the vendor specific class information. Thus, the firmware 119 may communicate with the management server application 135 using the IP address of the management server 130.

The DHCP server 120 is a computing device functioning as a server, providing the DHCP service to DHCP clients. In certain embodiments, the components of the DHCP server 120 may be similar to those of the computing device 110, and details of the components of the DHCP server 120 are not herein elaborated. In particular, the DHCP server 120 may provide configuration data for the DHCP clients, including IP addresses, default routes, and other configuration information of the DHCP clients. In certain embodiments, the DHCP clients may include all of the computing device 110 and the servers (e.g., the management server 130 and the VM server 140) in the system 100 that requires the IP address from the DHCP server 120. It should be noted that some of the servers may have fixed IP addresses, and thus does not need the DHCP service to provide the IP address. For example, the management server 130 and/or the VM server may each have a fixed IP address and do not need to obtain the IP address from the DHCP server. Alternatively, some of the servers may have dynamic IP addresses, which may change based on the DHCP IP lease configuration.

In certain embodiments, the DHCP server 120 may perform the IP leasing process. In particular, the DHCP server 120 may receive a request for the IP address from a DHCP client, which may be the computing device 110, the management server 130 and/or the VM server 140. In response to the request, the DHCP server 120 may issue an IP address to the DHCP client. Specifically, the DHCP server 120 may store a list of available IP addresses, which includes all of the IP addresses not assigned to any of the DHCP clients. In response to the request for the IP address, the DHCP server 120 may select one of the available IP addresses from the list, and assign the selected IP address to the DHCP client requesting the IP address.

In certain embodiments, the DHCP server 120 may configure the IP address of the management server 130, which stores the management server application 135, in its vendor specific class information. In particular, DHCP provides a plurality of options that may be used by DHCP servers and clients to exchange vendor specific information, and the DHCP server 120 can send the vendor specific options to the DHCP clients to granularly control configuration. The vendor specific class information is one of the vendor specific options (specifically, DHCP option 43), which is an opaque object of n octets, presumably interpreted by vendor-specific code on the DHCP clients and servers. The definition of the vendor specific class information is vendor specific. Thus, the vendor specific class information may be used by the DHCP server 120 to deliver the IP address of the management server 130 (i.e., the machine storing the management server application 135) to the computing device 110 (i.e., the thin client or the zero client). Details of the vendor specific options may be available in the document of "DHCP Options and BOOTP Vendor Extensions" (https://tools.ietf.org/html/rfc2132). Specifically, when the IP address of the management server 130 is determined (either as a fixed IP address, or as a dynamic IP address issued to the management server 130 by the DHCP server 120 in an IP leasing process), the DHCP server 120 may configure the IP address of the management server 130 in the vendor specific class information. Subsequently, in the IP leasing process to the computing device 110 (i.e., the thin client or the zero client), after an IP address is issued to the computing device 110, the DHCP server 120 may receive a request for the vendor specific class information from the computing device 110. In response, the DHCP server 120 may send the vendor specific class information requested to the computing device 110. Thus, the computing device 110 may obtain the IP address of the management server 130 from the vendor specific class information.

It should be particularly noted that the IP address is used as a specific format of the network address, which is used for network interface identification and location addressing. In certain embodiments, other forms of network addresses may be used to identify the computing device 110, the management server 130, and other computer nodes in the system 100.

The management server 130 is a computing device functioning as a server of the system 100, providing the management server application 135 to control and manage the computing device 110 (i.e., the thin client or the zero client). In certain embodiments, the components of the management server 130 may be similar to those of the computing device 110, and details of the components of the management server 130 are not herein elaborated. In certain embodiments, the management server 130 may be implemented by a computing device (i.e., a physical machine). For example, the management server 130 may be located on a physical machine dedicated for the management purpose, and the management server application 135 may be stored and executed on the physical machine of the management server 130. Alternatively, in certain embodiments, the management server 130 may be implemented by a virtual machine provided by the VM server 140. In this case, the management server application 135 may be stored on the virtual machine functioning as the management server 130, or may be deployed to the virtual machine functioning as the management server 130 from a different location, such that the management server application 135 may be executed on the virtual machine.

The VM server 140 is a computing device functioning as a server of the system 100, providing the VM 145 for the computing device 110 (i.e., the thin client or the zero client). In other words, the VM server 140 and the computing device 110 forms a client-server system. For example, the system may be a virtual desktop infrastructure (VDI) system, and the VM server 140 may be a VDI server, which provides a plurality of VMs for multiple thin clients or zero clients (i.e., the computing devices 110), such that all users may access or connect to the VMs from the computing devices 110. In certain embodiments, the components of the VM server 140 may be similar to those of the computing device 110, and details of the components of the VM server 140 are not herein elaborated. In certain embodiments, the VM server 140 may provide most of the resources of the system 100, which will be shared to all of the VMs accessed by the users from the computing device 110. In certain embodiments, the system 100 may include more than one VM server 140, which functions as one or more servers. In certain embodiments, the VM server 140 may be implemented by one single server device, or by multiple server devices.

In certain embodiments, the computing device 110 may be connected to a physical machine instead of the VM 145. In this case, the physical machine provides most of the resources of the system 100, which will be used by the user from the computing device 110 (i.e., the thin client or the zero client).

Figure 2:
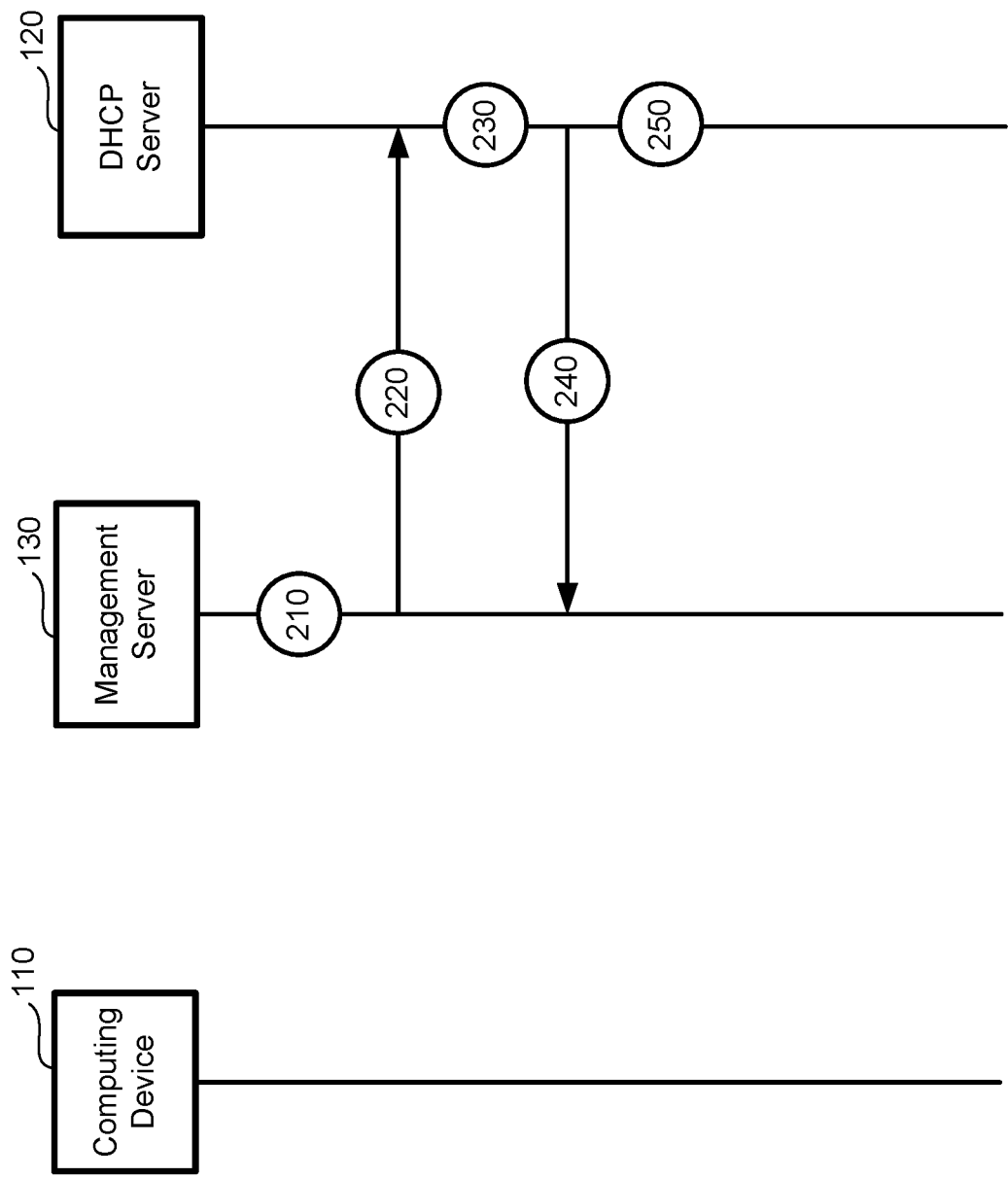
FIG. 2 depicts an IP leasing process for the management server by the DHCP server according to certain embodiments of the present disclosure.

FIG. 2 depicts an IP leasing process for the management server by the DHCP server according to certain embodiments of the present disclosure. In certain embodiments, the method as shown in FIG. 2 may be implemented on a system as shown in FIG. 1. It should be particularly noted that, unless otherwise stated in the present disclosure, the steps of the method may be arranged in a different sequential order, and are thus not limited to the sequential order as shown in FIG. 2.

As shown in FIG. 2, the management server 130 is a server using a dynamic IP address, which may be obtained by the DHCP service provided by the DHCP server 120. At procedure 210, the management server application 135 is deployed to the management server 130. At procedure 220, the management server 130, as a DHCP client, sends a request for an IP address to the DHCP server 120 via the network 150. At the DHCP server 120, at procedure 230, the DHCP server 120 checks the list of available IP addresses, and selects one IP address to be assigned to the management server 130. At procedure 240, the DHCP server 120 issues the IP address to the management server 130. At procedure 250, the DHCP server 120 configures the IP address assigned to the management server 130 in the vendor specific class information. Thus, the vendor specific class information may be available for the computing device 110 (i.e., the thin client or the zero client), such that the computing device 110 may obtain the IP address assigned to the management server 130.

It should be particularly noted that the procedures 220 to 240 may be optional. For example, if the management server 130 is a physical machine using a fixed IP address, the management server 130 may not need to request and obtain the IP address from the DHCP server 120. In this case, the DHCP server 120 may configure the fixed IP address of the management server 130 in the vendor specific class information. In certain embodiments, the configuration of the IP address of the management server 130 in the vendor specific class information may be performed automatically, or manually by an administrator.

Figure 3:
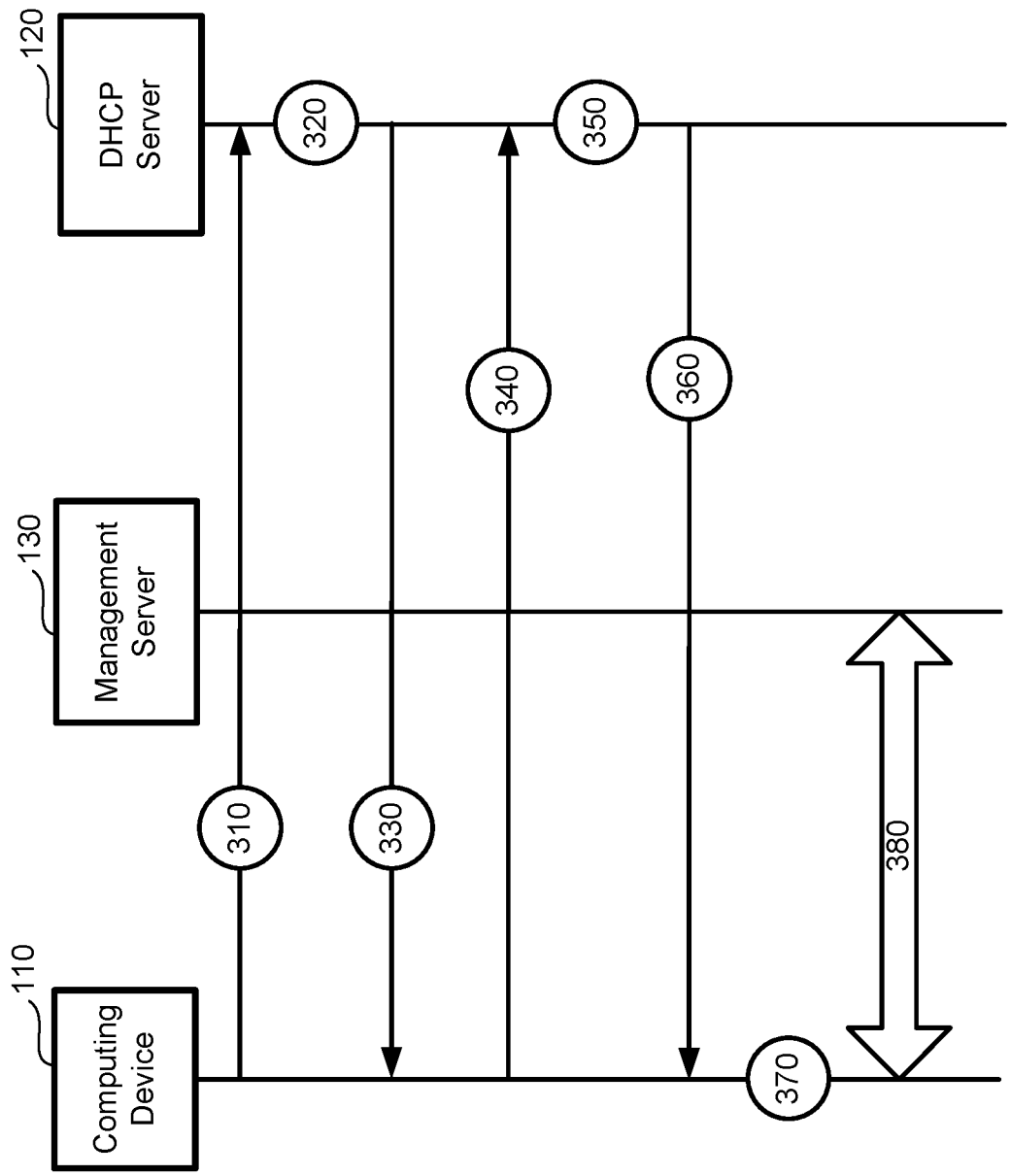
FIG. 3 depicts an IP leasing process for the computing device by the DHCP server according to certain embodiments of the present disclosure.

FIG. 3 depicts an IP leasing process for the computing device by the DHCP server according to certain embodiments of the present disclosure. In certain embodiments, the method as shown in FIG. 3 may be implemented on a system as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, once the DHCP server 120 has configured the vendor specific class information, at procedure 310, the computing device 110, as a DHCP client, may send a request for an IP address to the DHCP server 120 via the network 150. The request for the IP address may be similar to the request at procedure 220. At the DHCP server 120, at procedure 320, the DHCP server 120 checks the list of available IP addresses, and selects one IP address to be assigned to the computing device 110. At procedure 330, the DHCP server 120 issues the IP address to the computing device 110.

Upon receiving the IP address, at procedure 340, the computing device 110 sends another request for the vendor specific class information to the DHCP server 120 via the network 150. At procedure 350, the DHCP server 120 retrieves the vendor specific class information being requested, and at procedure 360, the DHCP server 120 sends the vendor specific class information to the computing device 110. Thus, at procedure 370, the computing device 110 may parse the vendor specific class information to retrieve the IP address of the management server 130. At procedure 380, the computing device 110 may communicate with the management server application 135 on the management server 130 using the IP address of the management server 130.

Figure 4:
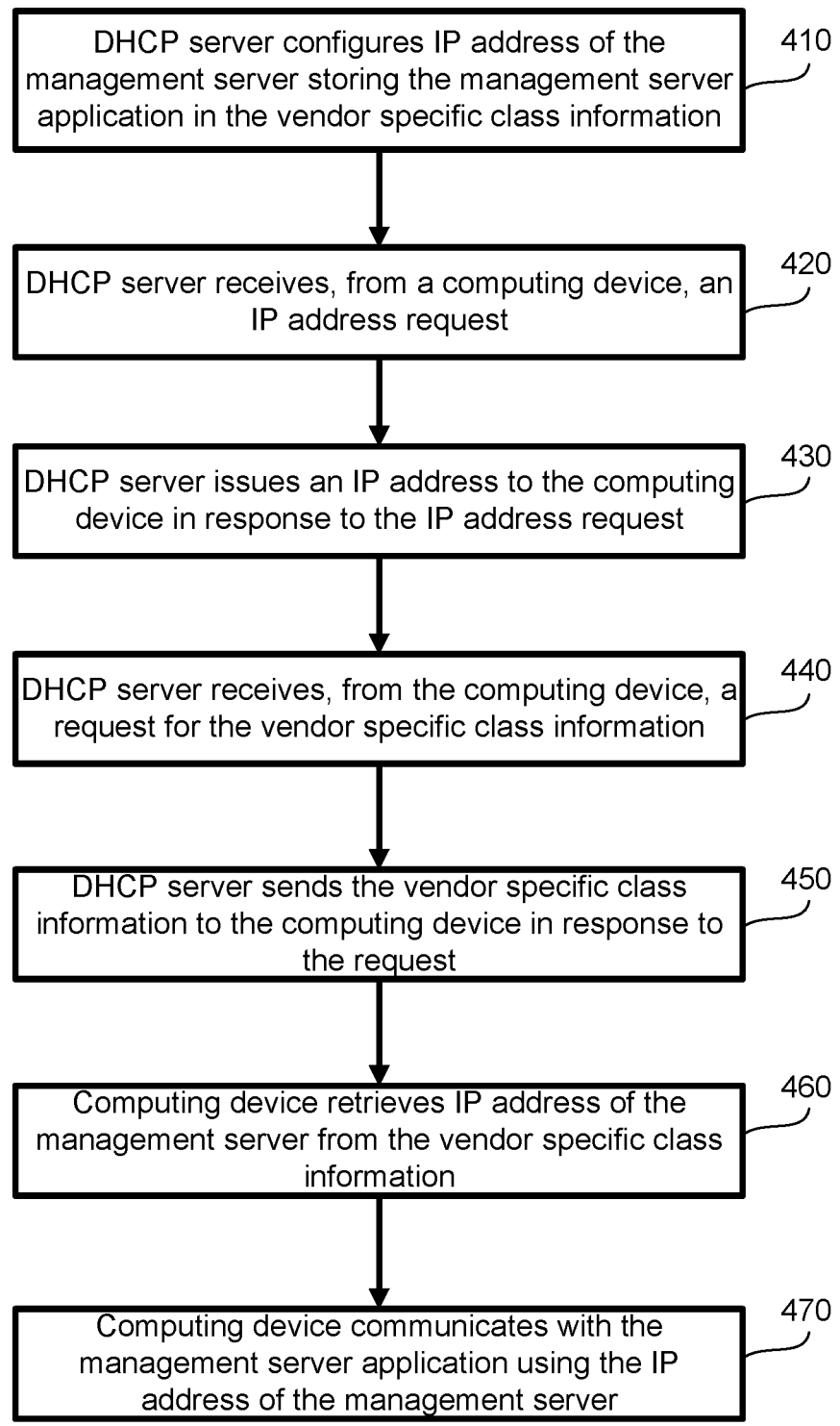
FIG. 4 depicts a flowchart showing a method for automatic discovery of an IP address of a machine storing a management server application according to certain embodiments of the present disclosure.

A further aspect of the present disclosure is directed to a method for automatic discovery of a network address of a machine storing a management server application. FIG. 4 depicts a flowchart showing a method for automatic discovery of an IP address of a machine storing a management server application according to certain embodiments of the present disclosure. In certain embodiments, the method as shown in FIG. 4 may be implemented on a system as shown in FIG. 1. It should be particularly noted that, unless otherwise stated in the present disclosure, the steps of the method may be arranged in a different sequential order, and are thus not limited to the sequential order as shown in FIG. 4.

As shown in FIG. 4, at procedure 410, the DHCP server 120 configures the IP address of the management server 130 storing the management server application 135 in the vendor specific class information. Specifically, the IP address of the management server 130 may be a fixed IP address, or may be a dynamic IP address obtained in an IP leasing process as shown in FIG. 2.

At procedure 420, the DHCP server 120 receives, from a computing device 110, an IP address request. It should be particularly noted that the system 100 may include multiple computing devices 110, and each of the computing devices 110 may respectively request its corresponding IP address. In other words, the DHCP server 120 may receive multiple IP address requests from multiple computing devices 110. At procedure 430, in response to the IP address request from the computing device 110, the DHCP server 120 issues an IP address to the computing device 110.

Once the IP address is issued to the computing device 110, at procedure 440, the DHCP server 120 receives, from the same computing device 110, a request for the vendor specific class information. In certain embodiments, the computing device 110 generates and sends the request for the vendor specific class information to the DHCP server 120 in response to receiving the IP address issued to the computing device 110 from the DHCP server 120. At procedure 450, the DHCP server 120 sends the vendor specific class information to the computing device 110 in response to the request. Thus, at procedure 460, the computing device may retrieve the IP address of the management server 130 from the vendor specific class information. At procedure 470, the computing device may communicate with the management server application 135 using the IP address of the management server 130.

In a further aspect, the present disclosure is related to a non-transitory computer readable medium storing computer executable code. The computer executable code, when executed at one or more processer, may perform the method as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1, and the storage device (not shown) of the DHCP server 120.

In certain embodiments, the system and method as described above enables the automatic discovery of the IP address of the management server using the vendor specific class information of the DHCP service. During the IP leasing process of the computing device, which functions as a thin client or a zero client, the DHCP server sends the vendor specific class information to the computing device, such that the computing device may parse the vendor specific class information to obtain the IP address of the management server. Thus, the computing device may communicate with the management server application using the IP address of the management server. This enables the user easiness and disables manual intervention to maintain high security of the system and the thin client devices.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:
1. A system, comprising:
a computing device communicatively connected to a dynamic host configuration protocol (DHCP) server via a network, configured to:
send a client network address request to a DHCP service provided by the DHCP server;
receive, from the same DHCP service provided by the same DHCP server, a client network address being issued for the computing device;
in response to receiving the client network address, send a request for vendor specific class information to the same DHCP service provided by the same DHCP server;
receive the vendor specific class information requested from the same DHCP service provided by the same DHCP server, wherein the vendor specific class information comprises a first network address of a machine storing a management server application, and the computing device functions as a thin client or a zero client managed by the management server application; and
retrieve the first network address of the machine storing the management server application from the vendor specific class information;
wherein the DHCP service provided by the DHCP server is configured to, before the computing device sends the request for the vendor specific class information to the DHCP server:
receive a network address request from the machine storing the management server application;
in response to the network address request, issue the first network address to the machine storing the management server application;
configure the first network address of the machine storing the management server application in the vendor specific class information;
receive the client network address request from the computing device; and
in response to the client network address request, issue the client network address to the computing device.

2. The system as claimed in claim 1, wherein the machine storing the management server application is a management server computing device or a virtual machine.

3. The system as claimed in claim 2, wherein the management server application is deployed to and executed on the management server computing device or the virtual machine.

4. The system as claimed in claim 1, wherein each of the client network address and the first network address issued by the DHCP service provided by the DHCP server is an internet protocol (IP) address.

5. The system as claimed in claim 1, wherein the computing device is further configured to:
 communicate with the management server application using the first network address of the machine storing the management server application.

6. A system, comprising:
 a dynamic host configuration protocol (DHCP) server, configured to provide a DHCP service, wherein the DHCP service is configured to:
  receive an IP address request from a machine storing a management server application via a network;
  in response to the IP address request, issue a first network address to the machine storing the management server application;
  configure the first network address of the machine storing the management server application in vendor specific class information;
  after configuring the first network address of the machine storing the management server application in the vendor specific class information, receive a client network address request from a computing device functioning as a thin client or a zero client managed by the management server application via the network;
  in response to the client network address request, issue a second network address to the computing device;
  receive a request for the vendor specific class information from the computing device via the network, wherein the request for the vendor specific class information is sent by the computing device in response to receiving the second network address; and
  in response to the request for the vendor specific class information, send the vendor specific class information requested to the computing device, wherein the computing device is configured to retrieve the first network address of the machine storing the management server application from the vendor specific class information.

7. The system as claimed in claim 6, wherein the machine storing the management server application is a management server computing device or a virtual machine.

8. The system as claimed in claim 7, wherein the management server application is deployed to and executed on the management server computing device or the virtual machine.

9. The system as claimed in claim 6, wherein each of the first network address and the second network address issued by the DHCP service provided by the DHCP server is an internet protocol (IP) address.

10. The system as claimed in claim 6, wherein the computing device is further configured to:
 send the client network address request to the DHCP service provided by the DHCP server via the network;
 receive the second network address issued to the computing device from the same DHCP service provided by the same DHCP server;
 in response to receiving the second network address, send the request for the vendor specific class information to the same DHCP service provided by the same DHCP server via the network; and
 receive the vendor specific class information requested from the same DHCP service provided by the same DHCP server.

11. The system as claimed in claim 10, wherein the computing device is further configured to:
 communicate with the management server application using the first network address of the machine storing the management server application.

12. A method for automatic discovery of a network address of a machine storing a management server application, the method comprising:
 receiving, by a dynamic host configuration protocol (DHCP) service provided by a DHCP server, an IP address request from the machine storing the management server application via a network;
 in response to the IP address request, issuing, by the same DHCP service provided by the same DHCP server, a first network address to the machine storing the management server application;
 configuring, by the same DHCP service provided by the same DHCP server, the first network address of the machine in vendor specific class information;
 after configuring, by the same DHCP service provided by the same DHCP server, the first network address of the machine in the vendor specific class information,
 receiving, by the DHCP service provided by the same DHCP server, a client network address request from a computing device functioning as a thin client or a zero client managed by the management server application via a network;
 in response to the client network address request, issuing, by the DHCP service provided by the same DHCP server, a second network address to the computing device;
 receiving, by the DHCP service provided by the same DHCP server, a request for the vendor specific class information from the computing device, wherein the request for the vendor specific class information is sent by the computing device in response to receiving the second network address; and
 in response to the request for the vendor specific class information, sending, by the DHCP service provided by the same DHCP server, the vendor specific class information requested to the computing device,
 wherein the computing device is configured to retrieve the first network address of the machine storing the management server application from the vendor specific class information.

13. The method as claimed in claim 12, wherein the machine storing the management server application is a management server computing device or a virtual machine, and the management server application is deployed to and executed on the management server computing device or the virtual machine.

14. The method as claimed in claim 12, wherein each of the first network address and the second network address issued by the DHCP service provided by the DHCP server is an internet protocol (IP) address.

15. The method as claimed in claim 12, wherein the computing device is further configured to:

send the client network address request to the DHCP service provided by the DHCP server via the network;

receive the second network address issued to the computing device from the DHCP service provided by the same DHCP server;

in response to receiving the second network address issued to the computing device from the DHCP service provided by the same DHCP server, send the request for the vendor specific class information to the DHCP service provided by the same DHCP server via the network;

receive the vendor specific class information requested from the DHCP service provided by the same DHCP server; and communicate with the management server application using the first network address of the machine storing the management server application.

\* \* \* \* \*